Feb. 4, 1941. M. CANTER 2,230,585
SAFETY IDENTIFICATION SEAL ADAPTED FOR ANIMALS
Filed Nov. 16, 1939
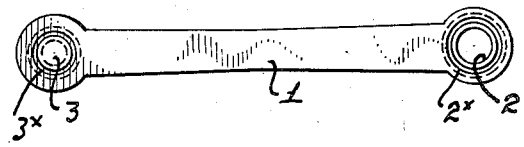
FIG. 1.
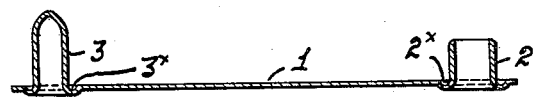
FIG. 1A.
FIG. 2.
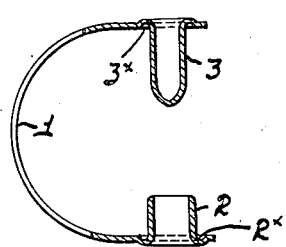
FIG. 4.
FIG. 3.
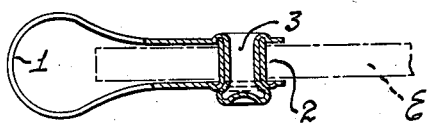
FIG. 5.
INVENTOR.
Morris Canter
BY H. Lee Helms Patented Feb. 4, 1941

2,230,585

UNITED STATES PATENT OFFICE 2,230,585

SAFETY IDENTIFICATION SEAL ADAPTED FOR ANIMALS

Morris Canter, New York, N. Y.

Application November 16, 1939, Serial No. 304,714

2 Claims. (Cl. 40—3)

The object of the present invention is to provide an identification seal particularly adapted for application to the ears of animals, and in such manner that the interlocking elements of the seal will be affixed to the ear of an animal and held against removal without destroying the seal, the structure guarding against any such compression of the ear as to interfere with the blood circulatory system.

The invention will be described with reference to the accompanying drawing, in which:

Figure 1 is a top plan view of an embodiment.

Figure 1A is a view in longitudinal sectional elevation of the embodiment shown in Figure 1.

Figure 2 is a view of the device partly in section, in its form ready for application.

Figure 3 is a view partly in vertical section showing the device applied to the ear of an animal, the latter being indicated by dotted lines.

Figure 4 is a schematic view showing in dotted lines an animal and in full lines the device applied to the ear of the animal.

Figure 5 is a fragmentary view showing the socket end of the device and a semi-circular fracture depression therein.

In the drawing, I have shown in the two parts of Figure 1, a unitary device comprising a strip 1 of bendable metal such as a white metal alloy, one end being formed by a series of drawing operations into a socket member 2 open at both ends. The metal immediately surrounding the socket member is preferably depressed in channel form at $2x$ so as to provide a circumferential weakened area which will break should the seal be tampered with in an attempt to force apart the interlocking elements. The opposite end of the strip is formed preferably by a series of drawing operations into a hollow post 3 preferably tapered at its top. As with respect to member 2, the metal area immediately surrounding post 3 may be channeled by a die so as to provide a weakened circumferential line at $3x$.

Before application to the ear of an animal the strip 1 is arcuately bent as shown in Figure 2, so as to invert the post 3 and bring it into register with the socket 2. In applying the seal to the ear of an animal the ear is passed between the post and the socket member and the post is pressed through the ear and downwardly until the strip area at the base of the post meets the top of the socket member 2, the latter acting as a restraining wall and spacing member. The usual type of hand operated clamp-die may be employed which will have a head for upsetting the end of the post 3 when the latter passes through the socket member 2 so that the conical end of the post will be depressed and the post flared over upon the inner end of the socket member as shown in Figure 3 wherein the outline of the ear E of the animal A is indicated by dotted lines. It will thus be seen that the socket member 2 acts both to receive the post and as a spacing member for the opposed ends of the strip 1.

Any suitable identification markings may be embossed onto the strip 1 including the areas immediately surrounding the post and socket member such as those areas which are concealed when the device is applied to the ear of an animal.

As shown in Figure 5, the fracture channel adjacent the socket member need not entirely surround the latter but may be arcuate in form as indicated at $2xx$. Such may be the case also with respect to the fracture line at $3x$ adjacent the post 3. One or both of these fracture lines may be provided and at either the post or at the socket member.

It will be understood that various changes may be made in the form and arrangement of the elements illustrated in the drawing and comprising the embodiment therein shown without departing from the spirit of the invention.

Having described my invention, what I claim and desire to secure by Letters Patent, is as follows:

1. A safety identification seal adapted for animals comprising a unitary strip, a socket member and hollow post, the socket member being disposed at one end of the strip and being open at opposite ends to receive the post, the socket member being projected away from the strip a distance adapting it to serve as a spacing member, the post being adapted to pass through the socket member and its end to be headed over upon the base of the socket member with the ear of an animal pierced by the post and socket member, the strip in an area thereof adjacent the post being formed with a fracture channel.

2. A safety identification seal adapted for animals comprising a strip of bendable metal having at one end and unitary therewith a sleeve-like socket member open at its opposite ends, the strip being formed at the end thereof opposite the socket member with a hollow post of greater length than the socket member and formed with a hollow tapered head, the post being adapted for passage through the socket member and for heading over upon the same, the socket member being adapted to serve as a spacer member for the ends of the strip, and the strip in an area thereof adjacent the post being formed with a fracture channel.

MORRIS CANTER.